(12) United States Patent
Nordell-Markovits et al.

(10) Patent No.: US 11,762,875 B2
(45) Date of Patent: Sep. 19, 2023

(54) MACHINE ASSISTED DATA AGGREGATION

(71) Applicant: SERVICENOW CANADA INC., Montreal (CA)

(72) Inventors: Alexei Nordell-Markovits, Montreal (CA); Andrej Todosic, Montreal (CA); Marie-Claude Cote, Montreal (CA)

(73) Assignee: SERVICENOW CANADA INC., Montreal (CA)

( * ) Notice: Subject to any disclaimer, the term of this patent is extended or adjusted under 35 U.S.C. 154(b) by 0 days.

(21) Appl. No.: 17/279,628

(22) PCT Filed: Sep. 26, 2019

(86) PCT No.: PCT/CA2019/051380
§ 371 (c)(1),
(2) Date: Mar. 25, 2021

(87) PCT Pub. No.: WO2020/061704
PCT Pub. Date: Apr. 2, 2020

(65) Prior Publication Data
US 2021/0390111 A1    Dec. 16, 2021

Related U.S. Application Data

(60) Provisional application No. 62/738,380, filed on Sep. 28, 2018.

(51) Int. Cl.
*G06F 16/25* (2019.01)
*G06F 16/2458* (2019.01)
*G06F 16/248* (2019.01)
*G06N 3/08* (2023.01)

(52) U.S. Cl.
CPC .......... *G06F 16/256* (2019.01); *G06F 16/248* (2019.01); *G06F 16/2471* (2019.01); *G06N 3/08* (2013.01)

(58) Field of Classification Search
CPC ... G06F 16/256; G06F 16/2471; G06F 16/248
See application file for complete search history.

(56) References Cited

U.S. PATENT DOCUMENTS

| 8,719,690 B2 | 5/2014 | Perelman et al. |
| 9,805,130 B1* | 10/2017 | Reddy .................... G06F 16/248 |
| 10,565,504 B2* | 2/2020 | Lindsley .................. G06N 5/04 |
| 2005/0257134 A1 | 11/2005 | Goodman et al. |
| 2016/0321367 A1* | 11/2016 | Arya .................... G06F 16/9535 |

(Continued)

FOREIGN PATENT DOCUMENTS

| EP | 1596310 A2 | 11/2005 |
| WO | 2012172386 A1 | 12/2012 |

*Primary Examiner* — Dangelino N Gortayo
(74) *Attorney, Agent, or Firm* — FASKEN MARTINEAU DUMOULIN LLP; Serge Lapointe

(57) ABSTRACT

Systems and method for use in assisting a user in data aggregation tasks. A system determines the type of data needed by the user to complete the data aggregation task and, based on an indication of the data needed, queries multiple data sources. The results from the multiple data sources are then collated and aligned as necessary. Inconsistencies in the data are resolved or flagged to the user for attention. A completed form or a presentation set of data is then presented to the user for validation.

6 Claims, 1 Drawing Sheet

(56) References Cited

U.S. PATENT DOCUMENTS

| | | | |
|---|---|---|---|
| 2017/0091665 A1* | 3/2017 | Sanchez | G06N 5/04 |
| 2018/0014038 A1* | 1/2018 | Lamburt | G06F 16/9535 |
| 2018/0033087 A1 | 2/2018 | Delinselle et al. | |
| 2018/0285738 A1* | 10/2018 | Bouton | G06F 16/24568 |
| 2019/0156198 A1* | 5/2019 | Mars | G06N 20/00 |
| 2019/0294731 A1* | 9/2019 | Gao | G06N 20/00 |
| 2020/0005153 A1* | 1/2020 | Ramanath | G06N 3/0427 |
| 2021/0342743 A1* | 11/2021 | Woolf | G06F 16/245 |

* cited by examiner

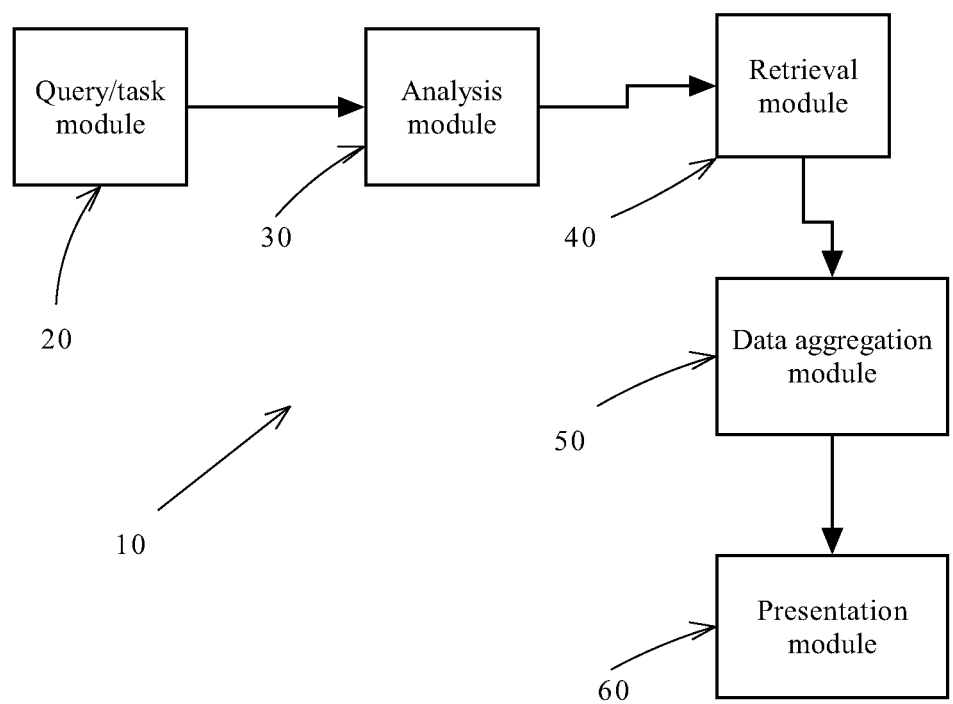

MACHINE ASSISTED DATA AGGREGATION

CROSS REFERENCE TO RELATED APPLICATIONS

The present application is a U.S. National Phase Application pursuant to 35 U.S.C § 371 of International Application No. PCT/CA2019/051380 filed Sep. 26, 2019, which claims priority to U.S. Provisional Patent Application No. 62/738,380 filed Sep. 28, 2018. The entire disclosure contents of these applications are herewith incorporated by reference into the present application.

TECHNICAL FIELD

The present invention relates to robotic process automation (RPA) systems that perform repetitive tasks based on a programmed set of instructions. More specifically, the present invention relates to the use of machine learning as applied to such automation systems to enhance the capabilities of such systems.

BACKGROUND

The rise of automation since the late 20th century is well documented. The application of such automated systems in manufacturing is well-known. These automated systems that perform pre-programmed, repetitive tasks are now being used not just in manufacturing but in other areas of industry and human activity. These have been used in scientific laboratories to carry out repetitive tasks that may be prone to error when executed by humans. They are now also beginning to be used in industries where they can provide error free execution of mundane, repetitive tasks. One major development in the past few years has been the rise of RPA (Robotic Process Automation). Instead of having a physical robot perform repetitive physical tasks, a robotic agent is used to perform repetitive virtual tasks on a graphical user interface. As an example, copying data from one form into another form and then saving the result is a task that RPA agents are well-suited to perform. Not only are the agents fast, they are accurate.

While robots are useful and while they excel in performing such repetitive tasks, they are not very robust or resilient. They are able to execute tasks only for circumstances that they are specifically programmed for. As such, deviations from their pre-programmed circumstances and context will cause these systems to fail at their tasks. As an example, in manufacturing, each component has to be at a very specific location from which a robot can locate and retrieve that component. If a component is located at a slightly different location, the robot may be unable to retrieve the component and may generate an error or system failure.

In tasks that involve the manipulation of data and/or the retrieval and/or placement of data, robots or robotic agents suffer from the same issues. If a robotic agent is programmed to retrieve specific data from a user interface and then to place that data in another user interface, those two user interfaces must be exactly as the robotic agent expects them to be. Any changes or deviations from the expected user interface may result in errors or in the failure of the robotic agent in executing the task. As well, in copy and paste operations, current robotic agents are not resilient enough to determine what a user might need in terms of data to be retrieved. In addition, if a robotic agent is programmed to copy data from specific locations to another specific location, the robotic agent cannot handle the nuances of that data unless specifically programmed to do so. Such programming, of course, can take hundreds of man-hours of effort and resources. Any small deviations from what robotic agents expect when executing their preprogrammed tasks will, invariably, produce errors unless an inordinate amount of time, effort, and resources is expended to cover off all possible permutations of what the robotic agents may encounter.

In addition to the above, current automated systems are only as good as the programs or software that operate on them. These systems are, for lack of a better term, "unintelligent". If programmed to process data, these systems blindly process the data, even if there are issues with the data. These systems are thus incorrigibly deterministic. Any errors encountered in the data are happily ignored unless the system is specifically programmed to find such errors.

There is therefore a need for systems and methods that allow such automated systems to be more robust and to be more flexible and resilient when encountering errors in the data being processed. Preferably, such systems and methods are such that they do not require painstakingly programming not only each and every possibility to be encountered but also what contingencies to follow for each one of these possibilities.

SUMMARY

The present invention provides systems and method for use in assisting a user in data aggregation tasks. A system determines the type of data needed by the user to complete the data aggregation task and, based on an indication of the data needed, may query multiple data sources. The results from the multiple data sources are then collated and aligned as necessary. Inconsistencies in the data are resolved or flagged to the user for attention. A completed form or a presentation set of data is then presented to the user for validation.

In a first aspect, the present invention provides a method for assisting a user with a data aggregation task, the method comprising:
 a) determining that a user is about to begin a data aggregation task;
 b) receiving an indication of data to be aggregated by said user;
 c) using said indication, determining, using machine learning, data sources to be queried;
 d) querying said data sources to gather data based on said indication;
 e) determining, using machine learning, presentation data to be presented to said user; and
 f) presenting said presentation data to said user for confirmation a correctness of said presentation data.

In a second aspect, the present invention provides a system for assisting a user with a data aggregation task, the system comprising:
 a query reception module for determining said data aggregation task;
 an analysis module for determine a type of data required by said data aggregation task;
 a retrieval module for formulating queries to data sources for said data aggregation task;
 a data aggregator module for receiving data from said data sources in response to said queries and for ensuring alignment between data sets from said data sources;
 a presentation module for presenting a presentation data set to said user, said presentation data set being derived from said data sets from said data sources;

wherein said presentation data set is presented to said user for validation.

BRIEF DESCRIPTION OF THE DRAWINGS

The embodiments of the present invention will now be described by reference to the following figures, in which identical reference numerals in different figures indicate identical elements and in which:

FIG. 1 is a block diagram illustrating a system according to one aspect of the invention and which may be used to implement a method according to another aspect of the present invention.

DETAILED DESCRIPTION

The present invention relates to the use and provision of machine learning and artificial intelligence methods and systems for use in RPA and in RPA executed tasks. As noted above, automated systems have been used in many fields. These systems are generally used to perform multiple pre-programmed repetitive tasks. Machine learning and systems relating to machine learning can provide such automated systems with the capability to adjust to changing conditions and circumstances, thereby providing robustness, resilience, and adaptability to these systems.

In one aspect of the present invention, robustness is provided to RPA by allowing automated systems to be adaptable to changing user needs. In one aspect of the present invention, a system provides for faster data aggregation from various data sources while ensuring data consistency. In data aggregation tasks where a user needs to gather data from various different data sources, the system can automatically gather the data needed by the user, collate that data, ensure consistency for that data, and fill in whatever forms are needed for the data. The system then presents the completed form (or most of the form) to the user for validation. Once validated, the system can then commit the changes to the form. In addition to this, the system can compare the specific data points gathered for the user and can ensure data consistency between the various data sources. Errors can then be located and, if necessary, corrected.

This aspect of the present invention allows for a method to perform data aggregation based on a user's intended task. The user first determines what data is to be aggregated from a number of data sources. An indication that this task is to be started is then received by the system. The system then determines what data sources to query for the data. The data is then retrieved from these data sources and collated. A set of data (a presentation set) from the data collected from the data sources is put together and assessed such that there is no data duplication and that there is consistency in the data set. This presentation set of data is then presented to the user and the user then validates this presentation set. If necessary, this presentation set is used to fill forms and/or user interfaces that a user may be using. Once validated, the changes to the form and/or user interface is then committed.

When a user is about to aggregate data (e.g. gather data about a customer to create a new account or a new profile or other tasks), this causes the system to respond so that the system can assist in the data aggregation process. Opening up a new form or creating a blank profile may be triggers that cause the system to query the user as to whether a data aggregation task is to begin.

Once the data aggregation task has been initiated, the user can then enter an indication as to the type of data needed for the data aggregation. This may be a customer name, a file number, a date of birth, or any indication as to the identity or identification of the data to be aggregated. The system, once this indication is received, can then determine the data needed. The system can use the circumstances surrounding the data aggregation to assist in determining the data needed. As an example, if the user has a new customer profile open and the profile requires a customer's name, date of birth, and address, the system can determine that these data points for a specific customer are required. Similarly, if the user has a new file profile window open, the system can determine that the new file profile requires the client's name, address, contact information (e g email address and telephone number), and possibly corporate name. Thus, based on the circumstances around the user's projected data aggregation task, the system can determine the type, identification, and quantity of information needed to complete the data aggregation task.

Once the system knows the type of data needed, it can then receive an indication of the actual data needed by the user. Thus, the user can enter, for example, a customer name, a file number, or any other identification of a specific person, file, or entity to whom the data being sought relates to. Thus, a user can enter the last name and first name of a person and the system can then use this as an indication of the data sought. As well, the user can enter a specific file number and the system can use this to retrieve the data associated with that file number. It should, of course, be clear that if the system encounters multiple instances of entities with similar or the same identification, the system can provide the user with not just the entity name but also other identifying indicia to ensure that the correct entity is being sought. Thus, if the user enters the name JOHN SMITH, the system can retrieve JOHN SMITH records and detail the address and/or the birth date for each record. This set of data can then be presented to the user so that user can select which JOHN SMITH is relevant to the data aggregation task.

After the system receives the indication from the user as to the data being sought, the system can then determine which data sources to query. As an example, if the system has a number of customer data sources available to it as well as records regarding automobile accidents and the data being sought relates to customer contact information, then the system would not be inclined to query the accident database. Depending on the number of database available to the system, one or more data sources may be tagged to be queried.

With a listing of data sources to be queried being completed, the system can then query these data sources, with the queries being based on the indication of the data being sought by the user as the basis for the queries.

Once the data sources return the results of the queries, the system can then collate, aggregate, and/or transform the data received. This includes gathering the data received, ensuring that there is consistency within the data points received from the various data sources, and that, if possible, the data is complete. Determining consistency may involve ensuring that the datapoints gathered are all aligned with one another and that there are no outliers or different datapoints. If necessary, the datapoints may be edited to ensure alignment and consistency or edits to the datapoints may be suggested by the system. As an example, if a customer's address is given in 5 data sources as MAIN AVENUE PARK WAY but given in 2 data sources as MAIN AVENUE PARKWAY, then the system may be configured to accept the data from the larger number of sources (i.e. using the PARK WAY spelling). Small differences such as these can be aligned and be made consistent by the system as long as the various data sources mostly agree on the data. However, if the data is completely inconsistent between data sources, then the system may flag this as an error and may present this to the user to be addressed. As an example, if 2 data sources indicate that a customer's address is 5 NEWTON WAY but 1 database indicates that the same customer lives on 10 COPERNICUS DRIVE, then the system can provide both addresses to the user and let the user select one.

After the system has aggregated the data and ensured (as much as possible) consistency within the data set, the resulting presentation data set is presented to the user. This may take the form of a filled out form for the user with the form being populated by the data gathered and collated from the various data sources. The user is then queried as to whether to confirm or reject the presented data set from the system. If rejected, the system can repeat the process using different queries to the different data sources to retrieve a different data set. If validated, the system can then commit the changes to the form.

As noted above, the system can give the user the opportunity to resolve any inconsistencies in the data by presenting the user with the various options for the inconsistent data. The user can then select which data point is to be included in the presentation data set.

Regarding implementation, the system illustrated in FIG. 1 can be used to implement the method detailed above. The system 10 in FIG. 1 has a query/task module 20 that receives an indication of the data aggregation task to be performed by the user. The analysis module 30 analyzes the circumstances surrounding the aggregation task to determine which data points are needed by the user. This module 30 can analyze forms and/or user interfaces accessed by the user to determine the data the user may need. As noted above, if the user opens a new customer profile form and the form requires a customer's contact information, the various datapoints in the customer's contact information can form the bulk of the data to be queried by the system.

Once the system knows what data to retrieve, a retrieval module 40 puts together a list of available and relevant data sources to be queried. These data sources are queried and the resulting data is then collated and analyzed by a data aggregation module 50. The data aggregation module 50 ensures alignment between the various data sets received and collates the data to result in a presentation data set to be presented to the user. Inconsistencies in the data that cannot be resolved by the system can be presented to the user by this module and, if necessary, can be changed in the various data sources. The results from the data aggregation module 50 are then passed to a presentation module 60.

The presentation module 60 presents the presentation data set to the user for validation. The data set may be presented as a filled out form and/or a completed user interface. Of course, the presented data set can be adjusted/amended by the user. In addition to presenting the presentation data set to the user, the presentation module 60 queries the user for validation of the presented data set. If the user validates the presented data set, then the changes to the form and/or the user interface may be committed and saved. If the user rejects the data set, as noted above, the system may repeat the process.

Regarding implementation, the various modules of the present invention may be implemented using any number of machine learning techniques and technologies. As an example, the various modules illustrated in FIG. 1 may utilize suitably trained neural networks to accomplish their various functions. The training sets to be used to train the various neural networks may be engineered to ensure that the proper result is the outcome of the neural network. As an example, a neural network for analysis module 30 would be trained to ensure that the type of data needed by specific forms is recognized and that these types of data are extracted from the form. As well, the data aggregator module 50 should be trained on data that ensures that small differences between data can be resolved (e.g. spelling can be determined based on which spelling is most prevalent in the data sets retrieved from the various data sources). In addition, the module 50 should be trained to ensure that unresolvable inconsistencies can be presented to the user for resolution and/or flagging. Of course, while the above notes a neural network, multiple neural networks may be used with each neural network performing on or more functions. Each module may thus use one or more neural networks to perform that module's function(s). Different training sets may also be used for these different neural networks.

It should also be clear that the term "data sources" includes databases, other programs, forms, other user interfaces, and other types and sources of data accessible by the system and from which the system can copy/source data.

It should be clear that the various aspects of the present invention may be implemented as software modules in an overall software system. As such, the present invention may thus take the form of computer executable instructions that, when executed, implements various software modules with predefined functions.

It should be noted that the various aspects of the present invention as well as all details in this document may be implemented to address issues encountered in all manners of business related dealings as well as all manners of business issues. Accordingly, the details in this document may be used in the furtherance of any aims, desires, or values of any department in any enterprise including any end result that is advantageous for the fields of accounting, marketing, manufacturing, management, and/or human resource management as well as any expression, field, or interpretation of human activity that may be considered to be business related.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for assisting a user with a data aggregation task, the method being executed by a processor, the method comprising:
    a) determining that said user is about to begin said data aggregation task;
    b) receiving an indication of data to be aggregated by said user;
    c) using said indication, determining, using a first neural network trained for querying data sources, data sources to be queried;
    d) querying said data sources to gather data sets based on said indication;
    e) aligning, using a second neural network trained for data aggregation, said data sets to obtain aligned data sets, said aligning comprising determining data inconsistencies in said data sets gathered from said data sources;
    f) determining presentation data to be presented to said user based on the aligned data sets, said presentation data comprising the data inconsistencies;
    g) presenting said presentation data to said user for confirmation of a correctness of said presentation data.

2. The method according to claim 1, wherein step b) further comprises determining data required by a form accessed by said user.

3. The method according to claim 1, wherein step g) comprises presenting a completed form to said user for validation.

4. The method according to claim 1, wherein said indication comprises at least one of: a name, a file number, and an identification of a person.

5. The method according to claim 1, wherein said step of ensuring alignment further comprises editing data in at least one database to ensure alignment between data in different data sources.

6. A system for assisting a user with a data aggregation task, the system comprising:
    a processor;
    a non-transitory storage medium operatively connected to the processor and comprising computer-readable instructions stored thereon,
    the processor, upon executing the computer-readable instructions, being configured for:
        receiving an indication of data to be aggregated by said user;
        determining said data aggregation task;
        determining a type of data required by said data aggregation task based on said indication;
        using a first neural network trained for querying data sources, formulating queries to data sources for said data aggregation task;
        receiving data sets from said data sources in response to said queries;
        using a second neural network trained for data aggregation, aligning data sets from said data sources to obtain aligned data sets, said aligning comprising determining data inconsistencies in said data sets gathered from said data sources;
        determining presentation data to be presented to the user based on the aligned data sets, said presentation data comprising the data inconsistencies; and
        presenting a presentation data set to said user, said presentation data set being derived from said data sets from said data sources;
    wherein said presentation data set is presented to said user for validation.

* * * * *